Patented July 20, 1954

2,684,306

UNITED STATES PATENT OFFICE 2,684,306

PRODUCTION OF FLUORESCENT SCREENS BY SETTLING MATERIALS FROM LIQUID SUSPENSIONS

Leslie Herculean Brewer, Twickenham, Vincent Arthur Stanley, London, and Ronald Puleston, Iver, England, assignors to Electric & Musical Industries Limited, Hayes, England, a company of Great Britain No Drawing. Application September 30, 1948, Serial No. 52,134

Claims priority, application Great Britain October 9, 1947

3 Claims. (Cl. 117—33.5)

This invention relates to the production of layers by settling materials from liquid suspensions, wherein a suspension of the material to be settled is placed in a vessel containing a support and the material is allowed to settle through the liquid on to said support, after which the supernatant liquid is decanted or siphoned off leaving a layer of said material on said support. Such a method will be referred to herein as "a method of the kind described." The invention relates particularly but not exclusively to the formation of screens of luminescent materials comprising a support with a layer of phosphor settled thereon, for example the luminescent screens of cathode ray tubes, luminescent lamps or X-ray apparatus. In the case of a cathode ray tube said vessel may be the tube envelope and said support may be the end of the tube.

In the formation of layers by settling materials from liquid suspension certain difficulties may be encountered, for example, a tendency for the particles of material to flocculate, leading to graininess and poor or non-uniform covering of the support, and a tendency for the layer of settled material to be disturbed during the operation of removing the supernatant liquid, as well as poor adhesion to the support whilst the material is wet so that the material tends to avalanche if the support is not horizontal or has parts which are inclined to the horizontal, for example the curved edges of the screen end of the envelope of a cathode ray tube.

The object of the present invention is to provide a method of the kind described wherein the deposited material adheres to the support whilst wetted by the supernatant liquid sufficiently well to permit of the liquid being removed by decanting without disturbance of the layer of said material and wherein the layer after being dried is sufficiently robust to permit of liquids being poured on to it without disturbing it. This robustness is particularly advantageous in the case of a cathode ray tube wherein the fluorescent screen is formed by settling a phosphor from a liquid suspension and wherein it is desired after the settling of the screen to apply further substances thereto by settling or otherwise.

According to the invention there is provided a method of the kind described wherein the material is settled from a dilute solution of a silicate containing a precipitate produced by mixing said solution with a solution of a substance which reacts with said silicate to form said precipitate.

The concentrations of said solution should be such that if the solutions are mixed together without said material being present a visible precipitate is formed, but should not be so high that if the solutions are mixed together with said material in suspension in one of them obvious flocculation occurs.

The material to be settled may be mixed with the solution of said substance, the mixture then being mixed with the silicate solution, or the silicate solution and the solution of said substance may first be mixed and said material then added. Preferably, however a solution of said substance is mixed with a suspension of said material in the silicate solution. In this case it is generally desirable to allow the suspension to stand at least for a few minutes after its preparation before the solution of said substance is mixed with it, and since said material tends to settle during the standing period, the suspension should be well shaken after or immediately before the solutions are mixed so as to obtain uniform distribution of said material in the settling medium prior to settling.

One mode of carrying the invention into effect will now be described by way of example in application to the formation of a luminescent screen for a cathode ray tube. The quantities of materials employed will of course depend on the size of screen required. In the present example it will be assumed that a screen of 12" diameter is to be formed. Two litres of double-distilled water are placed in a glass flask and to the water are added 35 ccs. of a phosphor suspension consisting of luminescent zinc sulphide and zinc cadmium sulphide in water, prepared by ball milling, in the proportions of 2½ gms. of sulphide to 100 ccs. of water. There are then added 2 ccs. of a solution of potassium silicate of density 1.33. The contents of the flask are then agitated by shaking the flask and allowed to stand for half an hour. At the end of this time 40 ccs. of magnesium sulphate solution are added, this solution consisting of magnesium sulphate of analytical reagent purity, in one tenth molal solution in water. There is thereby produced by reaction of the silicate with the magnesium sulphate a very small amount of a fine precipitate of magnesium silicate, which is observable at the end of the settling process as a slight cloudiness of the supernatant liquid. When the magnesium sulphate solution has been added to the flask the contents of the flask are agitated vigorously and the contents are poured into the bulb of a cathode ray tube, it being understood that the tube is supported with its neck vertical and the screen end lowermost. The tube is then allowed to stand undisturbed for two hours or more during which time the phosphor sinks through the liquid suspension medium and settles on the base of the tube. The supernatant liquid is then removed by decanting and the luminescent screen comprising the settled layer of phosphor is dried at about 200° C. If preferred the liquid may be removed by siphoning but the layer of phosphor adheres well to the base of the tube and does not tend to slip during decanting of the liquid.

Other substances may be used in place of magnesium sulphate, for example other compounds of magnesium or compounds of the alkaline earth metals, for example calcium sulphate or barium nitrate, these materials forming precipitated calcium silicate and barium silicate. In the above example the magnesium sulphate solution may be replaced by a solution of said other substances in similar molal concentration.

Instead of potassium silicate other silicates may be employed, for example sodium silicate. The invention is not limited to the use of the particular phosphor materials mentioned above; it may, for example, be applied to the formation of screens of other luminescent materials such as silicates and oxides of zinc and other metals. Moreover, the invention can be applied broadly to the formation of layers by settling materials, which materials are not necessarily phosphors.

During the initial part of the settling process the precipitate may in some cases be obscured by the phosphor or other material to be settled, and in some cases the precipitate may be carried down with said material as the latter settles, so leaving the settling medium clear. The precipitate may not therefore always be observable.

What we claim is:

1. In a method of producing a luminescent screen, the steps of mixing phosphor particles, a silicate solution and a magnesium sulphate solution to form a liquid medium containing fine particles of magnesium silicate mixed with phosphor particles, and settling particles of phosphor on to a support from said liquid medium.

2. In a method of producing a luminescent screen by settling phosphor particles on to a support, the steps of forming a suspension of said particles of phosphor in a silicate solution mixed with a solution of magnesium sulphate to produce fine particles of magnesium silicate, agitating the mixed solutions vigorously, and then settling said phosphor particles from said mixed solutions on to said support.

3. In a method of settling a luminescent screen on to a support, the steps of mixing together particles of a phosphor, a potassium silicate solution, and a solution of magnesium sulphate to form precipitated insoluble magnesium silicate particles mixed with phosphor particles, said potassium silicate solution and magnesium sulphate solution being in quantities substantially proportional to 2 ccs. of potassium silicate solution of density 1.33 in 1035 ccs. of water and 40 ccs. of magnesium sulphate in one tenth molal solution in water, and then settling said mixed phosphor and magnesium silicate particles on to said support.

References Cited in the file of this patent

UNITED STATES PATENTS

| Number | Name | Date |
| --- | --- | --- |
| 2,252,552 | Calbrick et al. | Aug. 12, 1941 |
| 2,412,654 | Sadowsky | Dec. 17, 1946 |
| 2,421,208 | Leverenz | May 27, 1947 |
| 2,451,590 | Tidik et al. | Oct. 19, 1948 |